United States Patent Office 3,338,729
Patented Aug. 29, 1967

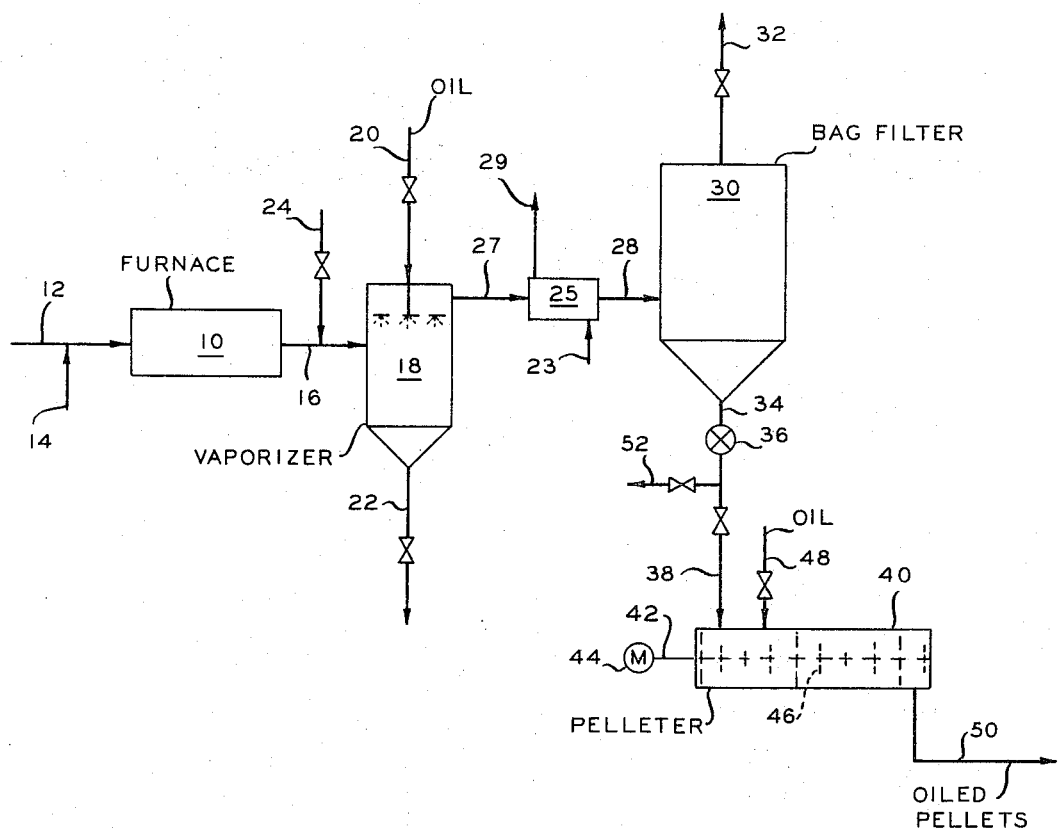

3,338,729
OIL IMPREGNATION OF CARBON BLACK
Armas A. Ruoho, Bartlesville, Okla., assignor to Phillips Petroleum Company, a corporation of Delaware
Filed May 26, 1964, Ser. No. 370,215
7 Claims. (Cl. 106—307)

This invention relates to a process and apparatus for impregnating carbon black particles with oil. Another aspect of the invention is concerned with producing oiled carbon black pellets.

It is conventional practice in the carbon black art to incorporate oil in carbon black pellets. Processes and apparatus for oiling carbon black pellets are disclosed in U.S. Patent 2,813,040, issued Nov. 12, 1957, to Rowe et al., and in U.S. Patent 2,699,381, issued Jan. 11, 1955, to W. R. King. Carbon black particles coated or impregnated with oil are more readily dispersed in solvents than pellets containing no oil. Oiled carbon black particles are advantageous in the manufacture of rubber-black-oil masterbatches because of the good dispersion of the black in the masterbatch.

It is an object of the invention to provide a process and apparatus for oil impregnating carbon black particles in the smoke from a carbon black furnace. Another object is to provide a process and apparatus for producing oiled pellets of carbon black. A further object is to provide a process and apparatus for facilitating the oil pelleting of carbon black particles. Other objects of the invention will become apparent to those skilled in the art upon consideration of the accompanying disclosure.

A broad aspect of the invention comprises water quenching the hot smoke from a carbon black furnace to a temperature not substantially above incipient cracking temperature of a selected impregnating oil but substantially above the boiling point of the oil, intimately contacting the quenched smoke with the oil so as to vaporize substantially all of the contacting oil, cooling the resulting vaporized oil-smoke mixture to below the condensation point of the oil, and recovering the oil coated and/or impregnated carbon black particles from the cooled mixture. The oiled particles are separated from the smoke in conventional manner as in a bag filter, a cyclone separator, or an electric precipitator. The oiled particles of carbon black are then pelleted with or without the further addition of oil in a dry pellet mill, a wet mixer type pelleter, or in a fluidized bed pelleter. In some applications in which the carbon black plant and the rubber plant are closely associated so that direct delivery of the oiled carbon black particles, without pelleting, to the rubber plant is feasible, the recovered oiled carbon black particles from the bag filter or other separation means are transferred in bulk directly from the carbon black plant to the rubber plant for use without pelleting.

A more complete understanding of the invention may be had by reference to the accompanying schematic drawing which is a flow illustrating one arrangement of apparatus for performing the invention.

Referring to the drawing, a carbon black furnace 10 is supplied with a hydrocarbon feed thru line 12 and air thru line 14 in which carbon black is produced under incomplete combustion conditions at a temperature of about 2400° F. The hot smoke effluent from the reactor is passed thru line 16 to an oil quench chamber 18 to which oil is injected thru line 20 and excess oil is removed thru line 22. Intermediate reactor 10 and quench chamber 18 a water quench from line 24 is injected into smoke line 16 so as to lower the temperature of the effluent smoke from about 2400° F. to a temperature in the range of about 500 to 850° F. and not substantially higher than the midpoint of the boiling range of the injected oil. The oil quench is controlled to reduce the temperature of the hot smoke to below the "dew point" of the oil and to incorporate a predetermined proportion of oil in the black. The smoke is passed thru line 27 into cooler 25 which is an indirect heat exchanger provided with inlet line 23 and outlet line 29 for fluid coolant. Cooler 25 may comprise a long section of conduit provided with air fins or a jacketed section of smoke conduit thru which air is passed to cool the conduit. Sufficient cooling is provided in cooler 25 to condense substantially all of the injected oil onto the carbon black particles in the smoke. The cooled effluent from cooler 25 is passed into bag filter 30 thru line 28. It is necessary to reduce the smoke temperature in cooler 25 to the range of 450 to 550° F., and preferably to about 500° F. before passing the cooled smoke into bag filter 30.

Denuded gas is vented thru line 32 and the recovered oiled carbon black particles are withdrawn from bag filter 30 thru line 34 under the control of feeder or star valve 36. A suitable conveyor 38 is connected with the upstream end of a pellet mill 40 in the form of a wet pellet mixer. Pellet mill 40 comprises a cylindrical tube having an axially positioned shaft 42 operated by an electric motor 44. Radial pins 46 are positioned on shaft 42 in a spiral arrangement from end to end of the shaft within the mill. When desired, additional oil is injected into mill 40 thru line 48. Oiled pellets are withdrawn from mill 40 thru conveyor line 50 and passed to packaging, storage, or transportation facilities.

When the oiled carbon black particles recovered thru line 34 are to be utilized without pelleting, the same are recovered thru line 52 without passing thru the pelleting mill.

The preferred oil for use in the process is an extender oil suitable for dispersion in masterbatching. The petroleum oils classified as highly aromatic, aromatic, naphthenes, and paraffins having a molecular weight in the range of about 300 to 500, an API of 7 to 40, an aromatic content in the range of 11 to 86 volume percent, and a viscosity in the range of 100 to 15,000 SUS at 100° F., are suitable for use in the process. A specific example of a suitable oil is one having 13 API, 360 molecular weight, about 77 percent aromatics and a viscosity of about 2700 SUS at 100° F.

The temperature of the oil and the rate of addition thereof to the smoke stream in vaporizer 18 is controlled to effect vaporization of all of the injected oil and to provide a concentration in the smoke stream of 0.0525 to 1.25 pounds of oil per pound of carbon black therein. It is preferred to operate so as to impregnate the carbon black particles with a weight of oil in the range of 0.25 to 1.0 pound per pound of carbon black.

To illustrate the invention, a heavy gas oil suitable for use as an extender oil and having the characteristics set forth in the table below is injected into the vaporizer thru spray nozzles. The reactor effluent at 2750° F. is first subjected to a water quench to reduce the temperature thereof to 750° F. This water quench is effected by a primary quench at the outlet of the furnace and a secondary quench just upstream of the vaporizer. The oil is heated to a temperature of about 750° F. and maintained under pressure in the oil feed line so as to avoid flashing oil therein and allow the flashing to take place in the vaporizer. The oil is injected at a rate substantially 45 percent of the weight of the black being passed thru the smoke line and into the vaporizer. All of the oil is vaporized and the effluent stream of smoke containing the vaporized oil is at a temperature of about 740° F. Further cooling of the smoke stream is effected in the cooler intermediate the vaporizer and the bag filter so as to reduce the smoke temperature to about 500° F. and effect condensation of the oil on the carbon black particles in the smoke. The recovered black contains 43.5 weight percent oil. This proportion of oil in the carbon black provides a masterbatch containing 35 parts of oil and 80 parts of black per 100 parts of rubber when adding 80 parts carbon black per 100 parts of rubber to the masterbatch.

Table.—Extender oil

| ASTM distribution, percent | ° F. (760 mm.) |
|---|---|
| I.B.P. | 510 |
| 5 | 550 |
| 10 | 572 |
| 20 | 602 |
| 30 | --- |
| 40 | 646 |
| 50 | 664 |
| 60 | --- |
| 70 | 700 |
| 80 | --- |
| 90 | 723 |
| 95 | --- |
| EP | 727 |
| Recovery, percent | 92 |
| Gravity API | 23.4 |
| Aniline No., F | 163.5 |
| Color, Saybolt | Dark |
| Sulfur, wt. percent | 0.226 |

The rate of injecting oil into the oil quench or vaporizer is regulated or controlled so as to incorporate the desired proportion of oil in the carbon black. This rate can be readily calculated from the known yield of the carbon black process and the oil charge rate to the furnace. The amount or proportion of oil to be incorporated in the black depends upon the use for which the rubber is designed and the type of rubber to which the black is to be added.

The vaporization of the oil in the smoke stream assists in cooling the smoke and enhances the carbon black particles recovered from the smoke. The condensation of the oil on the carbon black particles is analogous to the condensation of atmospheric moisture on dust or silver iodide particles to form rain. The oil coats and is adsorbed by the carbon black particles before agglomeration takes place and thus prevents the formation of chemical bonds, which once formed, prevent complete disintegration of carbon black clusters.

The invention has the following advantages:

(1) An improved carbon black dispersion is obtained when the product is incorporated in rubber, the carbon black readily separating into the original ultimate particles;

(2) A uniform oil concentration is obtained on the black in contrast to non-uniform oil concentration effected by spraying oil onto pellets, thus allowing a more uniform rubber product;

(3) The carbon black-oil product is readily dispersible in hydrocarbon solvents, thus simplifying the masterbatch of solution-polymerized rubbers by eliminating steam jet grinding of black and the difficulty of obtaining intimate mixing of carbon black-water slurries and hydrocarbon solutions of the base rubbers; and (4) The vaporization of the oil in the smoke stream cools the smoke so as to reduce the amount of other cooling agent required.

Certain modifications of the invention will become apparent to those skilled in the art and the illustrative details disclosed are not to be construed as imposing unnecessary limitations on the invention.

I claim:

1. A process for producing oiled carbon black particles from hot effluent smoke from a carbon black furnace at a temperature of at least 2000° F., which comprises the steps of:
   (1) water quenching said smoke to a temperature below the thermal cracking temperature and substantially above the mid-point of the boiling range of the oil of step (2);
   (2) intimately contacting the quenched smoke of step (1) with an extender oil in a vaporizing zone so as to vaporize substantially all of said oil;
   (3) further cooling the effluent smoke from step (2) so as to condense said oil on the carbon black particles in said smoke; and
   (4) recovering the oil-containing black particles of step (3) from said smoke.

2. The process of claim 1 including the step of pelleting the recovered black particles to produce oil-impregnated carbon black pellets.

3. The process of claim 2 wherein additional oil is added to said black during the pelleting step.

4. The process of claim 1 wherein the amount of oil incorporated in the black is in the range of 10 to 100 weight percent thereof.

5. A process for producing oiled carbon black particles from hot effluent smoke from a carbon black furnace which comprises the steps of:
   (1) water quenching said smoke at substantially effluent temperature to a temperature not substantially higher than the incipient cracking temperature of the oil of step (2) but substantially higher than the midpoint of the boiling range of said oil;
   (2) intimately contacting the quenched smoke from step (1) with an oil having an initial boiling point substantially above 500° F. so as to vaporize substantially all of said oil into said smoke;
   (3) cooling the smoke from step (2) to a temperature substantially below the "dew point" of said oil so as to condense the oil on the carbon black particles in said smoke; and
   (4) recovering the oil-coated carbon black particles from the smoke from step (3).

6. The process of claim 5 including the step of pelleting the recovered black particles to produce oil-impregnated carbon black pellets.

7. The process of claim 5 wherein additional oil is added to said black during the pelleting step.

References Cited

UNITED STATES PATENTS

| 2,585,659 | 2/1952 | Kilpatrick | 23—209.9 |
| 2,657,117 | 10/1953 | Sperberg | 23—209.9 |
| 2,735,828 | 2/1956 | Wood | 23—209.9 |
| 2,886,567 | 5/1959 | Wood | 23—209.4 |
| 3,011,902 | 12/1961 | Jordan | 23—314 |
| 3,075,829 | 1/1963 | Latham et al. | 23—209.4 |
| 3,282,719 | 11/1966 | Voet | 23—213 |
| 3,294,567 | 12/1966 | Dobbin et al. | 23—314 |

TOBIAS E. LEVOW, *Primary Examiner.*

S. E. MOTT, *Assistant Examiner.*